United States Patent [19]

Foster et al.

[11] 3,862,920

[45] Jan. 28, 1975

[54] DENTAL FILLING MATERIALS

[75] Inventors: John Foster, Sheerness; Richard John Walker, Harpenden, both of England

[73] Assignee: The Amalgamated Dental Company Limited, London, England

[22] Filed: Mar. 29, 1974

[21] Appl. No.: 456,376

Related U.S. Application Data

[63] Continuation-in-part of Ser. No. 341,106, March 14, 1973, Pat. No. 3,825,518.

[52] U.S. Cl..................... 260/42.52, 32/15, 106/35, 260/42.53, 260/77.5 CR, 260/77.5 MA, 260/482 B, 260/885, 260/998.11, 260/DIG. 36
[51] Int. Cl........ C08f 1/84, C08f 45/04, A61k 5/02
[58] Field of Search ........ 32/15; 106/35; 260/42.52, 260/42.53, 77.5 CR, 77.5 MA, 482 B, 998.11, DIG. 36, 885

[56] References Cited

UNITED STATES PATENTS

| | | | |
|---|---|---|---|
| 3,297,745 | 1/1967 | Fekete et al. | 260/471 C |
| 3,553,174 | 1/1971 | Hausslein et al. | 260/77.5 CR |
| 3,629,187 | 12/1971 | Waller | 32/15 |

*Primary Examiner*—Morris Liebman
*Assistant Examiner*—H. H. Fletcher
*Attorney, Agent, or Firm*—Learman & McCulloch

[57] ABSTRACT

A composite dental filling material comprises a mixture of a finely divided, inert inorganic filler and the reaction product of an organic aliphatic diisocyanate and a hydroxylakyl acrylate or methacrylate. The filling material also contains at least one other ethylenically unsaturated monomer, namely a bisphenol A derivative having at least two terminal acrylate or methacrylate ester groups. Further the filling material may also contain a catalyst and an activator.

6 Claims, No Drawings

DENTAL FILLING MATERIALS

This application is a continuation-in-part of co-pending Ser. No. 341,106 filed Mar. 14th, 1973 now U.S. Pat. No. 3,825,518.

This invention is concerned with improvements in and relating to composite tooth filling or stopping compositions comprising a mixture of a polymerizable organic component and an inert finely divided, inorganic filler component. More particularly, the invention is concerned with an improvement in a modification of the invention forming the subject matter of U.S. Pat. No. 3,825,518.

In U.S. Pat. No. 3,825,518 we have described and claimed a composite dental filling material comprising a mixture of a finely divided, inert inorganic filler and the reaction product of an organic diisocyanate and a hydroxyalkyl acrylate or methacrylate. The inert filler preferably forms the major proportion by weight of the dental filling material, suitably from 70 to 80% by weight thereof, and preferably has a particle size of from 5 to 60 microns. Examples of suitable inert filler materials which may be used include silane coated glasses, aluminium oxide, quartz and silica.

The reaction product of the organic diisocyanate and the hydroxyalkyl acrylate (referred to as the "urethane diacrylate") is prepared by reacting at least two moles of the hydroxyalkyl acrylate per mole of organic diisocyanate. The urethane diacrylate may be represented by the general formula:-

$CH_2=C(R^1) - COO - R^2O-CO-NH - R^3 -NH-CO-O- R^2 - OOC C(R^1) = CH_2$ in which $R^1$ is a hydrogen atom or a methyl group, $R^2$ is an alkylene group and $R^3$ is a divalent hydrocarbon radical.

The organic diisocyanate used in the preparation of the urethane diacrylate may be an aromatic diisocyanate but is, preferably, an aliphatic diisocyanate, such as, for example, 2,2,4-trimethylhexamethylene diisocyanate. The hydroxyalkyl acrylate is preferably one containing from 2 to 10 carbon atoms in the alkyl group (i.e., $R^2$ in the above formula contains from 2 to 10 carbon atoms) and may be, for example, hydroxypropyl methacrylate. The polymer prepared by polymerizing the urethane diacrylates have the advantage of being water white and this may be aesthetically useful in particular applications of the composition.

The composition of application Ser. No. 341,106 may contain other polymerizable unsaturated monomers in addition to the urethane diacrylate and it has now been found, in accordance with the present invention, that a particularly useful other ethylenically unsaturated monomer is a bisphenol A derivative having at least two terminal acrylate or methacrylate ester groups. These monomers are disclosed in U.S. Pat. No. 3,066,112. Those monomers containing two terminal acrylate or methacrylate ester groups may be represented by the formula:-

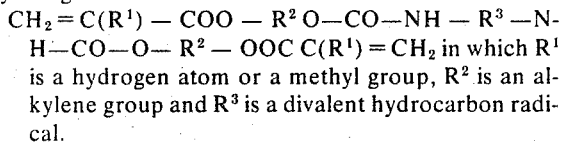

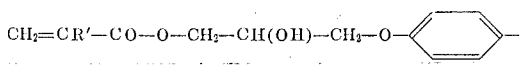
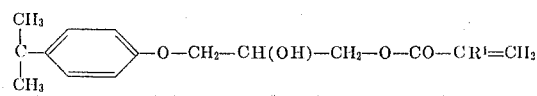

in which $R^1$ is a hydrogen atom or a methyl group. The monomer in which $R^1$ is methyl is hereafter referred to as Bis-GMA.

Accordingly the present invention provides a composite dental filling material comprising a mixture of a finely divided inert inorganic filler, a urethane diacrylate (as hereinbefore defined) and a bisphenol A derivative having at least two terminal acrylate or methacrylate ester groups. The weight ratio of urethane diacrylate to bisphenol A derivative is suitably from 30:70 to 70:30 parts by weight, preferably from 40:60 to 60:40 parts by weight.

The dental filling compositions in accordance with the present invention may also contain other ethylenically unsaturated monomers, particularly polyunsaturated cross-linking monomers, especially the diacrylates or dimethacrylates of dihydric alcohols, such as, for example, ethylene glycol dimethacrylate or triethylene glycol dimethacrylate.

The filling composition as filled into a cavity in a tooth will also contain a catalyst, e.g., a free radical catalyst such as benzoyl peroxide and, desirably, also a polymerization activator, e.g., an amine type activator such as dimethyl-para-toluidine or paratolyl-diethanolamine.

Clearly, the composition as sold cannot comprise the monomer together with activator and catalyst and hence will generally be sold as a two part composition no part of which contains both activator and catalyst. Clearly, it is possible to formulate many variations of two part packages but the essential features of the two part package will be that together the two packages will contain monomers (by which term is meant urethane diacrylate and bisphenol A derivative optionally with other ethylenically unsaturated polymerizable monomers), filler, catalyst and activator; neither of the parts of the package containing both catalyst and activator. Examples of such compositions are:

PART A
  Monomer
  Filler
  Activator
PART B
  Catalyst alone; or
  Catalyst and filler; or
  Catalyst and monomer.

Another form of composition in accordance with the invention is one comprising a first component containing monomer and activator and a second component comprising filler and catalyst.

In accordance with a preferred embodiment of the invention the urethane diacrylate is present in one part of the two-part composition and the bisphenol A derivative is present in the other part of the composition. A particularly preferred from of two-part package in accordance with the invention comprises a first part containing the urethane diacrylate and filler together with catalyst or, preferably, activator and a second part containing the bisphenol A derivative and filler together with derivative or, preferably catalyst.

In order that the invention may be well understood the following Example is given by way of illustration only.

EXAMPLE a. A 2 litre reaction vessel is fitted with a glass stirrer and stirrer gland connected to a variable speed motor via the central neck. A condenser fitted with a drying tube, a nitrogen inlet tube, a dropping funnel and a thermometer are fitted in the remaining necks. 606.0 gms of hydroxypropyl methacrylate are weighted out and added to the reaction vessel. 10.48 gms dibutyl tin dilaurate are weighed out and added to the reaction vessel. Stirring is commenced, nitrogen is passed through the apparatus and the vessel is cooled in an ice bath to about 5°C. 441.6 gms of 2,2,4 trimethyl hexamethylene diisocyanate are weighed out and added to the dropping funnel. The diisocyanate is added over 1 hour not allowing the temperature of the reactants to rise above 25°C. the reactants are stirred for a period of one hour following the complete addition of the diisocyanate.

A two part composition is made up by separately mixing each of the following two liquids (A and B) with sufficient silane coated inorganic filler (particle size less than 60 $\mu$) to give pastes A and B each containing about 79% by weight of filler.

| Liquid A | |
|---|---|
| Urethane dimethacrylate from (a) above | 75.54% by weight |
| Triethylene glycol dimethacrylate | 19.62% by weight |
| p-Tolyl-diethanolamine (activator) | 1.563% by weight |
| Uvistat 247 (U.V. Stabiliser) | 1.969% by weight |
| Syloid 244 (silica gel) | 1.31% by weight |
| Liquid B | |
| Bis-GMA | 63.50% by weight |
| Triethylene glycol dimethacrylate | 31.70% by weight |
| Butylated hydroxy toluene (antioxidant) | 0.186% by weight |
| Di-tert butyl sulphide (polymerization inhibitor) | 0.120% by weight |
| Water | 0.37% by weight |
| Benzoyl peroxide (catalyst) | 3.70% by weight |
| Syloid 244 | 1.81% by weight |

The inorganic filler can be for example crystalline quartz, glass, silica, or aluminium oxide having a particle size of approximately 60 $\mu$. The filler is coated with 0.5% of a silane coupling agent such as $\gamma$-methacryl-oxyproply-trimethoxy-silane by using the following technique. The silane is dissolved in a 30/70 water acetone mixture and the resultant liquid is mixed with the filler to obtain a slurry. The acetone and water are then removed from the slurry at 100°C and finally the silane is condensed onto the surface of the filler by heat treatment, at 125°C for 2 hours. The coated filler is then sieved through a 60.$\mu$ silk.

c. The mixed material obtained by mixing parts A and B in equal portions by weight will have a working time at 21°C of approximately 4 minutes and a set time at mouth temperature of 3 minutes. After 24 hours water immersion the set material will have a compressive strength of 2,500 kgm/cm², a modulus of rupture of 110N/mm², a solubility of 0.08% and a water absorption of 0.17%. The Wallace hardness is 150 and the coefficient of thermal expansion is $33 \times 10^{-6}$ over the temperature range 22° – 52°C.

We claim:

1. A composite dental filling material comprising a mixture of from 70 to 80 percent by weight of a finely divided, inert inorganic filler; and from 30 to 20 percent by weight of a polymeric mixture A, said polymeric mixture A comprising from 30 to 70 percent by weight of the reaction product of an organic aliphatic diisocyanate and the hydroxyalkyl acrylate or methacrylate having the formula:-

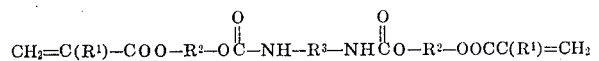

wherein $R^1$ is a hydrogen atom or a methyl group, $R^2$ is an alkylene group, and $R^3$ is a divalent aliphatic hydrocarbon radical; and from 70 to 30 percent by weight of a bisphenol A derivative having at least two terminal acrylate or methacrylate ester groups.

2. The filling material according to claim 1 in which the inorganic filler has a particle size of from 5 to 60 microns.

3. The filling material as defined in claim 2 in which the alkyl group of the hydroxyalkyl acrylate or methacrylate contains from 2 to 10 carbon atoms.

4. The filling material of claim 1 wherein the ratios of polymer A are 40:60 to 60:40.

5. The filling material of claim 1 which includes a polyunsaturated cross-linking monomer.

6. The filling material of claim 5 in which the polyunsaturated cross-linking monomer is a diacrylate or dimethacrylate of a dihydroxy alcohol.

* * * * *